(12) United States Patent
Sadowy

(10) Patent No.: US 10,508,461 B1
(45) Date of Patent: Dec. 17, 2019

(54) ABOVE-GROUND POOL INSULATION ASSEMBLY AND METHOD OF INSULATING AN ABOVE-GROUND POOL

(71) Applicant: Michael Sadowy, Clarence Center, NY (US)

(72) Inventor: Michael Sadowy, Clarence Center, NY (US)

(*) Notice: Subject to any disclaimer, the term of this patent is extended or adjusted under 35 U.S.C. 154(b) by 0 days.

(21) Appl. No.: 16/172,230

(22) Filed: Oct. 26, 2018

(51) Int. Cl.
| E04H 4/00 | (2006.01) |
| F16B 1/00 | (2006.01) |
| F16B 11/00 | (2006.01) |

(52) U.S. Cl.
CPC .......... *E04H 4/005* (2013.01); *E04H 4/0056* (2013.01); *F16B 1/00* (2013.01); *F16B 11/006* (2013.01); *F16B 2001/0035* (2013.01)

(58) Field of Classification Search
CPC .................................................. E04H 4/005
USPC .............................................. 4/506; 482/55
See application file for complete search history.

(56) References Cited

U.S. PATENT DOCUMENTS

| 3,648,300 | A | * | 3/1972 | Eisenberg | E04H 4/0037 4/494 |
| 3,648,303 | A | * | 3/1972 | Stewart | B65D 88/528 52/5 |
| 3,654,639 | A | * | 4/1972 | Lankheet | E04H 4/0018 52/169.9 |
| 3,720,064 | A | * | 3/1973 | Hall | E04H 4/00 405/55 |
| 3,748,800 | A | * | 7/1973 | Glicksberg | E04H 9/02 52/167.4 |
| 3,789,435 | A | * | 2/1974 | Heisner | E04H 4/0043 52/152 |
| 4,047,340 | A | * | 9/1977 | Witte | E04H 4/0043 52/169.7 |
| 4,056,942 | A | * | 11/1977 | Yoshida | E02C 1/00 405/4 |
| 4,170,799 | A | * | 10/1979 | Ratelband | A63B 69/12 4/488 |
| 4,260,296 | A | * | 4/1981 | Hilfiker | E02D 29/025 404/7 |
| 4,464,802 | A | * | 8/1984 | Glonek | E04H 4/0043 111/49 |
| 4,551,108 | A | * | 11/1985 | Bass | A61H 37/005 441/116 |
| 4,577,859 | A | * | 3/1986 | Gossett | A63B 69/12 182/3 |
| RE32,181 | E | * | 6/1986 | Glonek | E04H 4/0043 111/49 |

(Continued)

*Primary Examiner* — Lori L Baker
(74) *Attorney, Agent, or Firm* — Vincent G. LoTempio; Kloss, Stenger & LoTempio; David T. Stephenson

(57) ABSTRACT

An above-ground pool insulation assembly and method of insulating an above-ground pool provides at least one modular panel fabricated from perimeter and reinforcement steel bar that form a rectangular frame. The frame is encapsulated by a metallic sheet to create a pocket of insulating air. An adhesive metallic tape secures the metallic sheet to the frame. Resilient strips attach to the edges of the cover panel to help prevent moisture from entering the mount side. The modular panel mounts mechanically and magnetically to the peripheral sidewall of an above-ground, metal sided swimming pool, so as to insulate the pool, and thereby reduce heat loss from the body of water in the pool due to efficiency of conservation of energy exchange with the environment.

20 Claims, 12 Drawing Sheets

(56) References Cited

U.S. PATENT DOCUMENTS

| | | | | |
|---|---|---|---|---|
| 4,601,073 A | * | 7/1986 | Methot | E04H 4/142 |
| | | | | 4/506 |
| 4,776,581 A | * | 10/1988 | Shepherdson | A63B 5/11 |
| | | | | 4/493 |
| 5,492,438 A | * | 2/1996 | Hilfiker | E02D 29/0241 |
| | | | | 405/285 |
| 5,546,615 A | | 8/1996 | Chamness | |
| 5,546,815 A | * | 8/1996 | Wittry | G01P 1/003 |
| | | | | 73/861.77 |
| 2007/0180603 A1 | * | 8/2007 | Rose | E04H 4/00 |
| | | | | 4/488 |
| 2009/0144892 A1 | | 6/2009 | Brindle | |

* cited by examiner

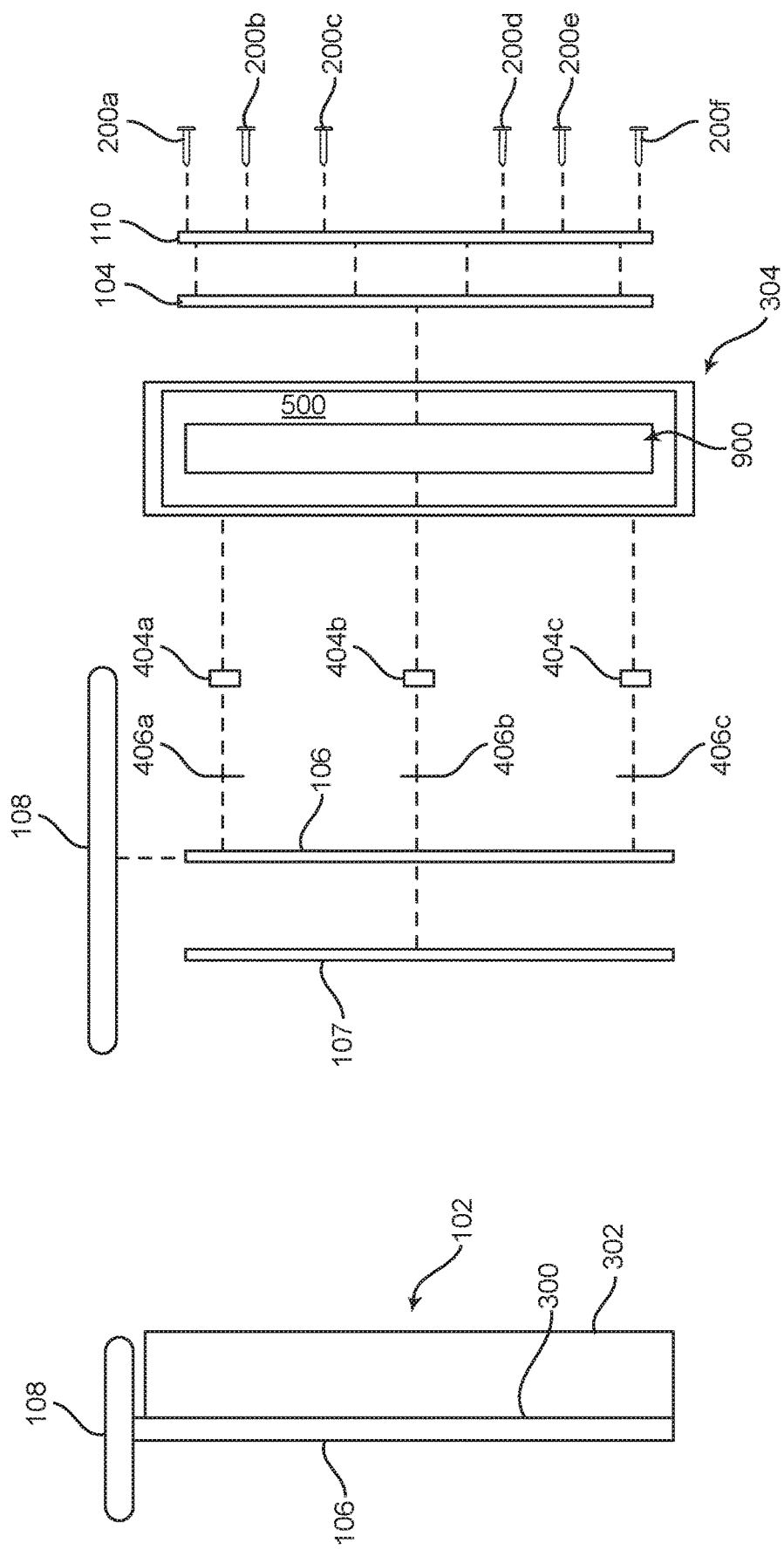

ABOVE-GROUND POOL INSULATION ASSEMBLY AND METHOD OF INSULATING AN ABOVE-GROUND POOL

FIELD OF THE INVENTION

The present invention relates generally to an above-ground pool insulation assembly and method of insulating an above-ground pool. More so, the present invention relates to an above-ground swimming pool insulation assembly that provides at least one modular panel fabricated from perimeter and reinforcement steel bar that form a rectangular frame; whereby the frame is encapsulated by metallic sheet to create a pocket of insulating air; and whereby the modular panel mounts mechanically or magnetically to the peripheral sidewall of an above-ground, metal sided, plastic, resin, or metal framed swimming pool, so as to insulate the pool, and thereby reduce heat loss from the body of water in the pool due to efficiency of conservation of energy exchange with the environment.

BACKGROUND OF THE INVENTION

The following background information may present examples of specific aspects of the prior art without limitation, approaches, facts, or common wisdom that, while expected to be helpful to further educate the reader as to additional aspects of the prior art, is not to be construed as limiting the present invention, or any embodiments thereof, to anything stated or implied therein or inferred thereupon.

Typically, above-ground swimming pools are popular because they are much less expensive than in-ground pools. This is because with the above-ground pool, it is not necessary to dig any holes or alter the ground in any way, if there is a flat area large enough to receive the out-of-ground pool. However, a problem with above-ground pools is that they do not take advantage of the beneficial insulating soil around them as do in-ground pools, since the pool walls are surrounded by the atmospheric air. The walls of above-ground pools are often made of a metallic sheet, e.g. steel or aluminum, and consequently do not have good insulating properties to keep the water warm. Indeed, the pool water will often become much colder by losing its heat through the pool walls.

It is known in the art that a solar sheet can be used as a heat insulating barrier and to prevent water evaporation which has a cooling effect on the water. The solar sheet also heats the pool water through the instrumentality of the sun rays, the sheet floating on the water surface and concentrating the sun rays in the water. However, despite the use of a solar sheet, a considerable amount of heat loss takes place through the pool walls. It consequently costs more to the pool owner for heating his pool water.

It is known in the art that 24 hours a day, 7 days a week, when swimming pools are open for the season, heat exchange is occurring. While this may sound like bad news, it also works to our advantage. When heat exchange, (energy), is thought of as a gain, it means we like how the water feels warmer to us. When it is thought of as a loss, such as on cloudy days that block out the suns warming rays, or on cold nights, the water feels noticeably colder. Science has conveniently broken down heat loss into three basic categories: Convective—exposed water evaporating; Conductive—exposed exterior pool wall is warm to the touch; and Radiant—invisible waves of heat we feel coming from the exposed exterior without touching it. Generally, as energy is absorbed, it raises the water temperature. When it has peaked, that same energy begins to transfer back into the environment, lowering the water temperature.

Thus, when the water temperature is higher than the surrounding ambient air temperature, both conductive and radiant heat loss occurs. The surface area of the exposed exterior wall is approximately half that of the waters total surface area, though it has no defense against the elements. Take into account that the pool wall is metal, and with only a 7 mph wind, heat exchange doubles. When the exterior wall is wet, additional energy is lost due to evaporation during the process.

It is known that gases/air possess poor thermal conduction properties compared to liquids and solids, and thus makes a good insulation material if they can be trapped. In order to further augment the effectiveness of a gas (such as air) it may be disrupted into small cells which cannot effectively transfer heat by natural convection. Furthermore, considering the current needs of the environment, the need to conserve energy and efficiency are of paramount importance. In addition to energy savings, above-ground pools fail to adequately conserve heat which may result in less hours of operable use, higher energy costs, and generally less consumer enjoyment.

Other proposals have involved insulation assemblies for swimming pools. The problem with these insulation assemblies is that they do not easily attach and detach from the sidewall of the pool with magnets. Also, they do not have air as the primary insulation means. Even though the above cited insulation assemblies meet some of the needs of the market, an above-ground pool insulation assembly and method of insulating an above-ground pool that provides at least one modular panel fabricated from perimeter and reinforcement steel bar that form a rectangular frame; and whereby the frame is encapsulated by a metallic sheet to create a pocket of insulating air; and whereby an adhesive metallic tape secures the metallic sheet to the frame; and whereby resilient strips attach to the edges of the frames exterior to help prevent the elements from entering the mount side of the panel, and whereby the modular panel mounts mechanically or magnetically to the peripheral sidewall of an above-ground swimming pool, so as to insulate the pool, and thereby reduce heat loss from the body of water in the pool, is still desired.

SUMMARY

Illustrative embodiments of the disclosure are generally directed to an above-ground pool insulation assembly and method of insulating an above-ground pool. The above-ground pool insulation assembly provides at least one modular panel fabricated from a steel bar frame that is encapsulated by metallic sheet. The metallic sheet encapsulates the frame, such that a pocket of insulating air forms therein. The modular panels are installed in a peripheral consecutive manner along the peripheral sidewall of the above-ground pool. In one non-limiting embodiment, the modular panels install mechanically and or magnetically to the peripheral sidewall of an above-ground, metal sided, resin or metal framed swimming pool. The configuration of the modular panels serves to insulate the pool, and thereby reduce heat loss from the body of water in the pool due to efficiency of conservation of energy exchange with the environment.

In some embodiments, the insulation assembly may include a plurality of modular panels that mount in a peripheral arrangement to the sidewalls of the above-ground pool. The modular panel includes a frame having two galvanized steel side bars, a top bar, and a bottom bar joined at right angles to form a rectangle, or square shape. Two additional galvanized steel reinforcement bars extend between the top and bottom steel bars, in a parallel and spaced-apart disposition to the side bars.

A metallic sheet encapsulates the frame, forming a first side and a second side of metallic sheet around the frame. This forms a cavity inside the metallic sheet. A pocket of air forms in the cavity between the first and second sides of metallic sheet, and the side bars. The air serves as an insulator. A metallic tape fastens the metallic sheet to the bars of the frame. In some embodiments, metallic tape is attached to the top bar, bottom bar, and side bars on the second side of the frames exterior. The adhesive metallic tape helps prevent moisture from entering the cavity and air from escaping.

Multiple constructed modular panels are installed in a peripheral consecutive manner along the peripheral sidewall of the pool. In one embodiment, the mount side of the modular panels engage the sidewall, and the exterior side are externally visible. In mounting to the sidewall of the pool, the side bars of the frame form a friction fit relationship with ribs along the sidewall of the pool, such that each modular panel fits between a pair of ribs. In another installation embodiment involving a pool with a metal sidewall, the bars and the metallic sheet of the modular panel is magnetically attached to the metal sidewall of the pool.

In one aspect, an above-ground pool insulation assembly, comprises a plurality of modular panels, the modular panels comprising a frame, the frame having four perimeter bars arranged to form a perimeter; and multiple reinforcement bars extending between two of the perimeter bars in a parallel, spaced-apart relationship, whereby the perimeter bars form a square or rectangular shape.

The assembly may further include a cover panel overlaying the modular panels; and a metallic sheet encapsulating the frame, the metallic sheet forming a cavity between the perimeter bars, whereby the cavity contains air. The assembly may further include an adhesive tape fastening the metallic sheet to the perimeter bars, or the reinforcement bars, or both. The assembly may further include adhesive metallic tape joined to the metallic sheet, at or near the perimeter bars, whereby the metallic tape helps inhibit air from escaping the cavity and moisture from entering the cavity.

In another aspect, the modular panels are defined by a mount side and an exterior side.

In another aspect, the perimeter formed by the perimeter bars is defined by a rectangular or square shape.

In another aspect, the perimeter bars comprises 24 gauge galvanized steel rail.

In another aspect, the perimeter bars are welded together.

In another aspect, the reinforcement bars comprise 24 gauge galvanized steel rail.

In another aspect, the reinforcement bars comprises at least two bars joined telescopically.

In another aspect, the metallic sheet comprises aluminum.

In another aspect, the metallic sheet comprises an eco-foil.

In another aspect, the adhesive tape comprises a metallic tape.

In another aspect, the resilient strips comprise rubber strips.

In another aspect, the resilient strips are parallel to the perimeter bars.

In another aspect, the resilient strips form at least one aperture.

In another aspect, the assembly further comprises at least one fastener.

In another aspect, the fastener passes through the aperture in the resilient strips.

In another aspect, assembly is operable to enable mounting to a sidewall of an above-ground pool.

In another aspect, the perimeter bars form a friction fit relationship with ribs along the sidewall of the above-ground pool.

In another aspect, perimeter bars and the metallic sheet of the modular panel are magnetically attached to a metal sidewall of the pool.

One objective of the present invention is to insulate an above-ground swimming pool, so as to minimize heat loss from the body of water contained therein.

Another objective is to retain the highest water temperature from the daylight hours, and dramatically slow the loss of heat at night.

Another objective is to utilize an eco-foil and a pocket of air inside the modular panel to insulate the above-ground pool.

Yet another objective is to provide modular panels that have no moving parts, require no maintenance, and store in place for the off season.

Yet another objective is to enhance the aesthetics of the above-ground pool with the modular panels.

Yet another objective is to provide an easy to install above-ground pool insulation assembly.

Yet another objective is to provide an inexpensive to manufacture above-ground pool insulation assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 8 illustrates an elevated side view of the above-ground pool insulation assembly mounted to an above-ground pool, in accordance with an embodiment of the present invention;

FIG. 9 illustrates a blow up view of the above-ground pool insulation assembly shown in FIG. 8, in accordance with an embodiment of the present invention;

Like reference numerals refer to like parts throughout the various views of the drawings.

DETAILED DESCRIPTION OF THE INVENTION

Figure 1:
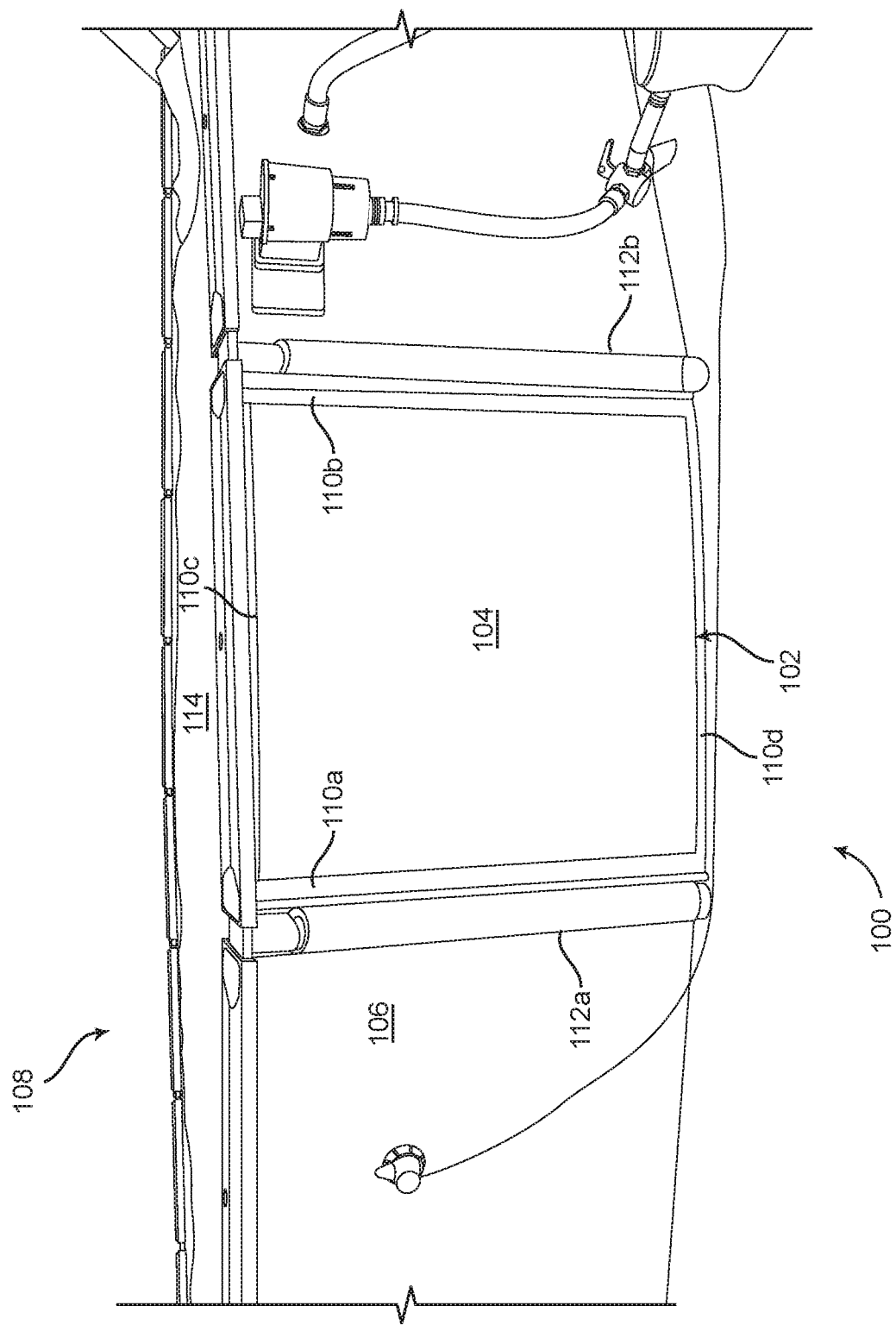
FIG. 1 illustrates a perspective view of an exemplary above-ground pool insulation assembly mounted to an above-ground pool, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An above-ground pool insulation assembly 100 and method 1300 of insulating an above-ground pool is referenced in FIGS. 1-13. As referenced in FIG. 1, the above-ground pool 108 insulation assembly 100, hereafter "assembly 100" provides a plurality of modular panels 102 that are configured to easily mount to the perimeter sidewall 106 of an above-ground swimming pool 108; and thereby minimize heat loss from the body of fluid contained therein. Modular panels 102 utilize a pocket of air, and a metallic sheet 304 to create an insulation effect around the sides of the above-ground pool 108. Modular panels 102 mount mechanically and/or magnetically to the sidewall 106 of the above-ground pool 108. Modular panels 102 are easily detached and stored when not in use. Modular panels 102 also provide a cover panel 104 that enhances the aesthetics of the above-ground pool 108.

Figure 2:
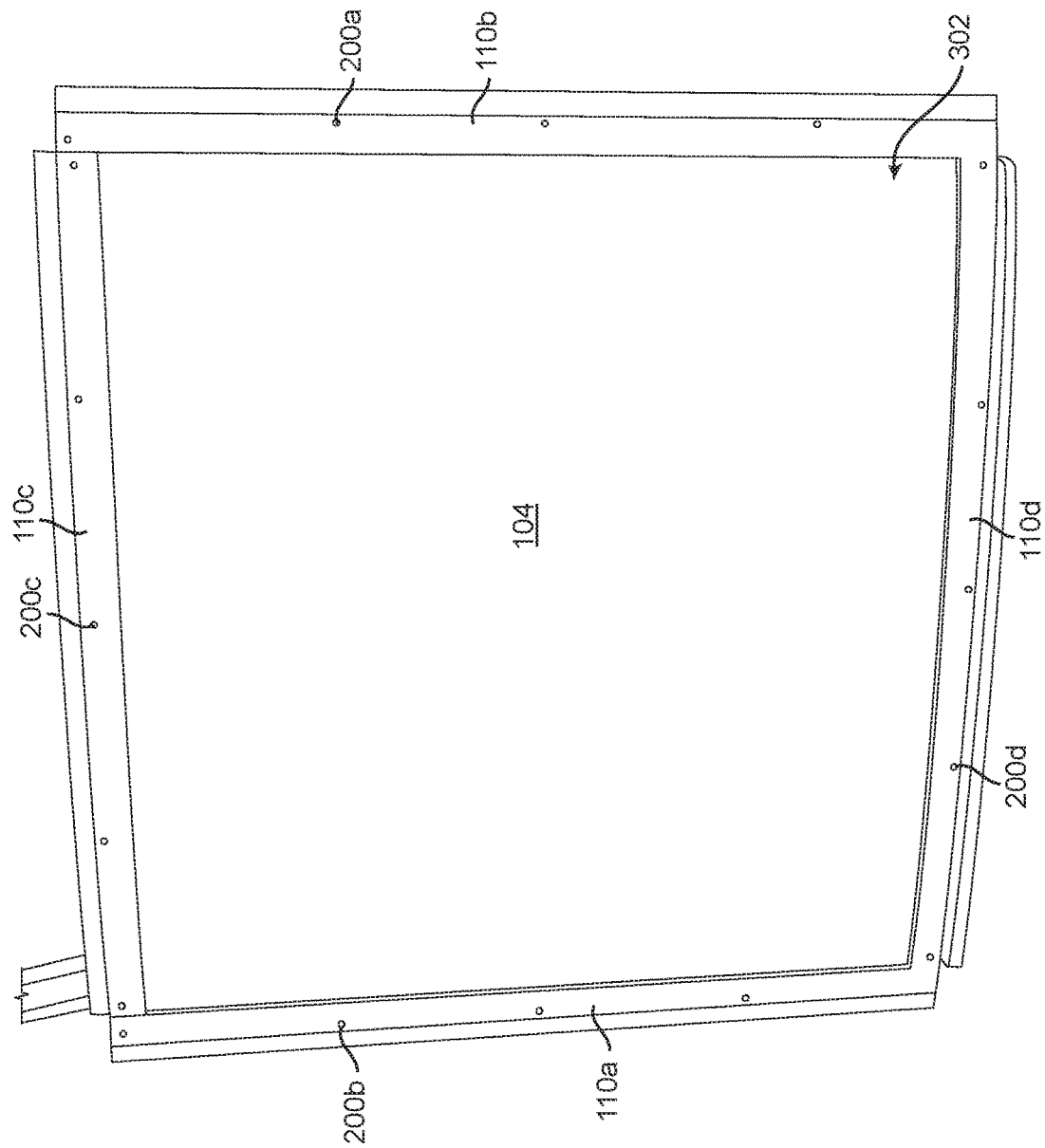
FIG. 2 illustrates a frontal view of an exemplary modular panel, in accordance with an embodiment of the present invention.
Figure 3:
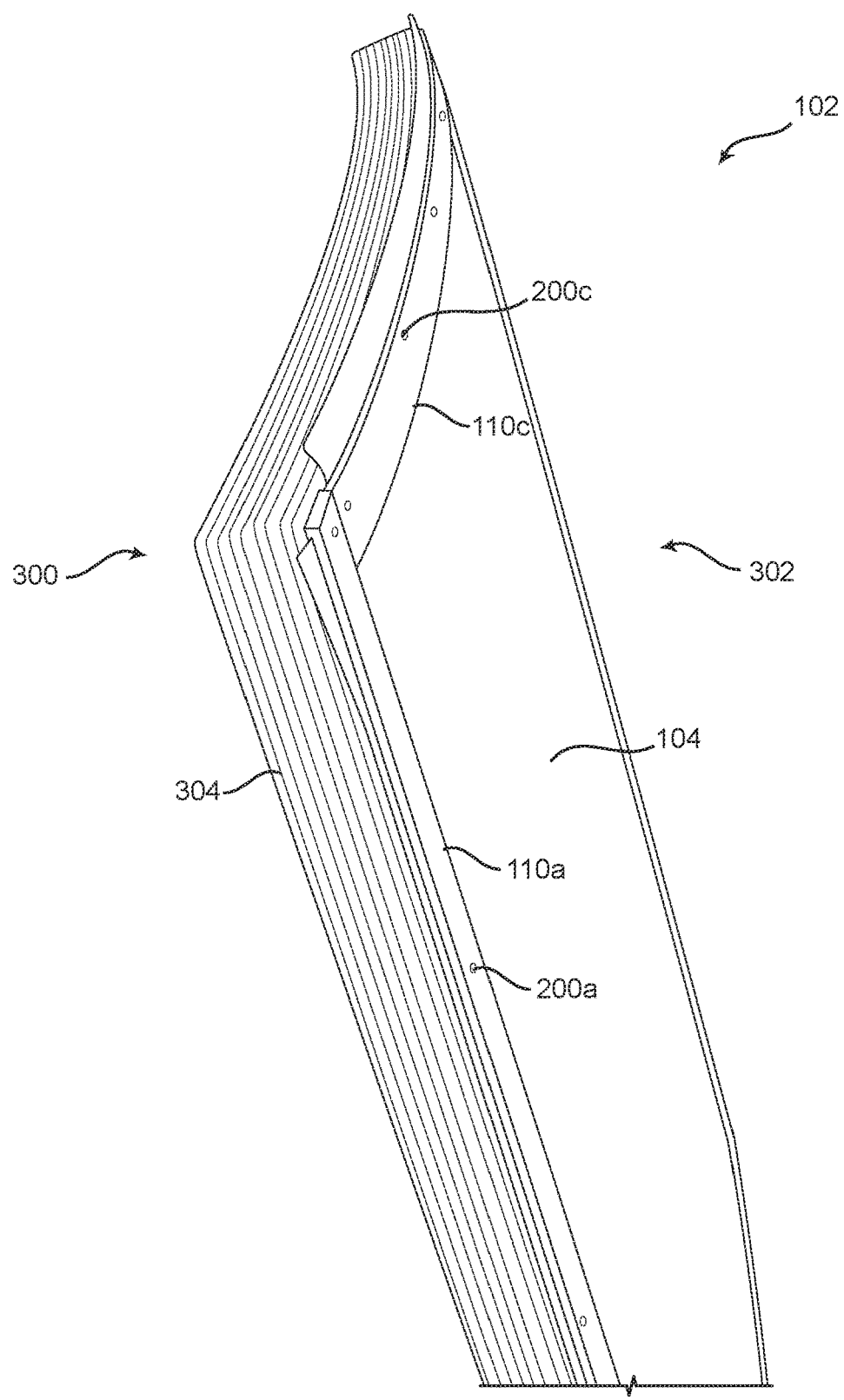
FIG. 3 illustrates a side perspective view of an exemplary modular panel, in accordance with an embodiment of the present invention.

As FIG. 2 shows, assembly 100 comprises a plurality of modular panels 102 that are defined by a mount side 300 that engages, and mounts to the sidewall 106 of an above-ground pool 108; and an exterior side 302 that is visible when the modular panels 102 are mounted to the above-ground pool 108 (FIG. 3). Modular panels 102 are installed in a peripheral consecutive manner along the peripheral sidewall 106 of the pool 108. In one embodiment, mount side 300 of the modular panels 102 engage the sidewall 106 of pool 108, and exterior side 302 is externally visible, creating an aesthetic surface for the above-ground pool 108. A pool liner 107 may cover sidewall 106.

Figure 5:
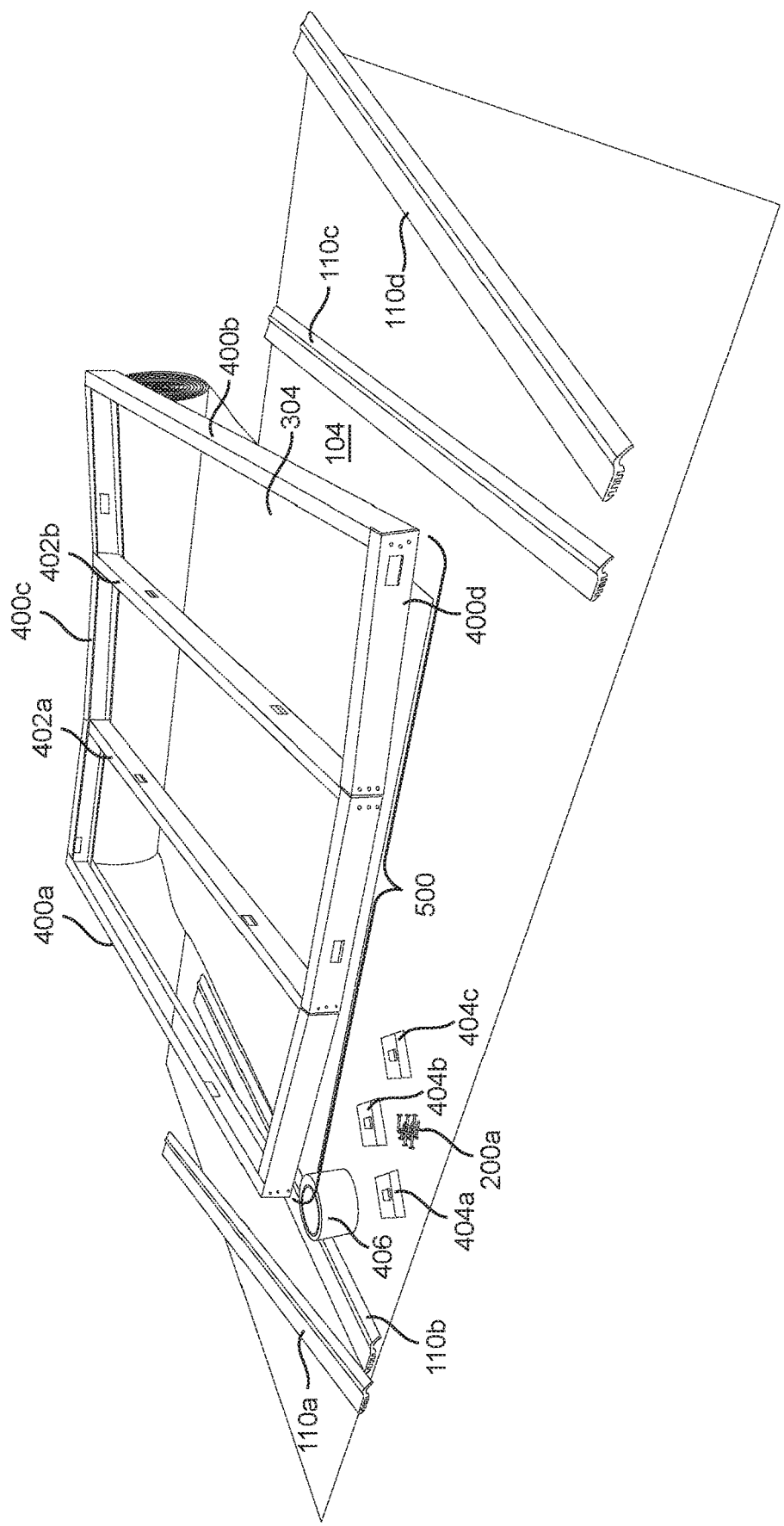
FIG. 5 illustrates a perspective view of the modular panel shown in FIG. 4, showing the frame assembled, in accordance with an embodiment of the present invention.

Looking at FIG. 5, modular panels 102 comprise a frame 500 that forms the supportive foundation and provides the structural integrity of the modular panels 102. Frame 500 is made of multiple bars arranged in a rectangular or square shape. Frame 500 is configured to fit onto a sidewall 106 of an above-ground pool 108. Frame 500 is also configured to retain air, when encapsulated by a metallic sheet 304, discussed below. This enables the primary objective of insulating the above-ground pool 108.

Figure 4:
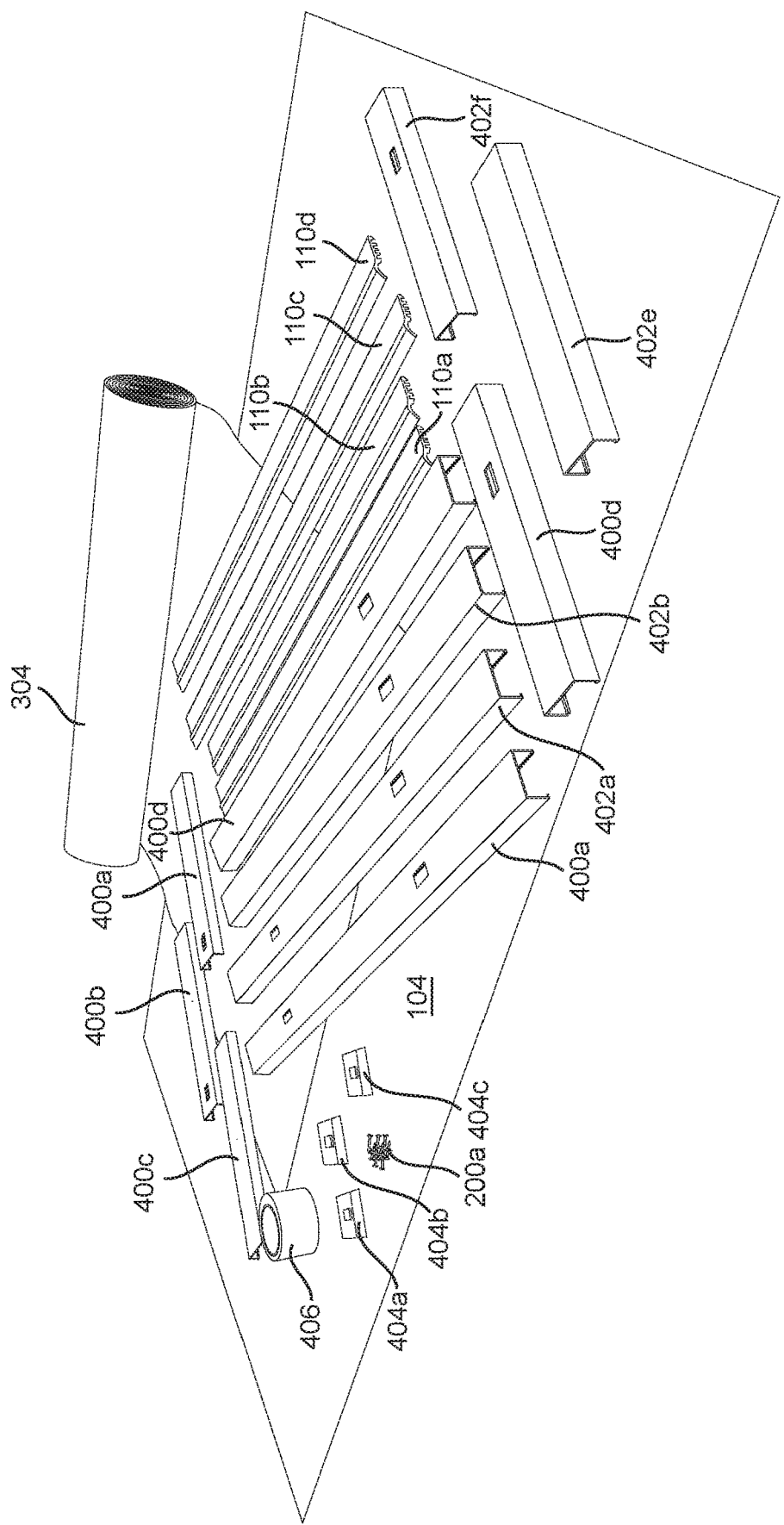
FIG. 4 illustrates a perspective view of an exemplary modular panel disassembled, showing the frame, the metallic sheet, the adhesive tape, the resilient strips, cover panel, and the magnet, in accordance with an embodiment of the present invention.

Looking back at FIG. 4, frame 500 comprises four perimeter bars 400a, 400b, 400c, 400d arranged to form a perimeter. The perimeter forms a closed area. Perimeter bars 400a-d may be welded, bolted, or adhered together to form the closed perimeter. In some embodiments, perimeter bars 400a-d may form rectangular, or square shape that matches the curvature of sidewall 106 for above-ground pool 108. In another embodiment, perimeter bars 400a-d comprises at least two bars 400a, 400b joined telescopically, or in short joints that make up a longer bar 400a. In one non-limiting embodiment, perimeter bars 400a-d comprises 24 gauge galvanized steel rail. Though in other embodiments, other materials may be used. It is significant to note that in FIG. 4, 400a-c are all 400b disassembled; and 400d, 402e, and 402f are all 400c disassembled. Though different combinations of bars may be configured to enable scalability.

Figure 6:
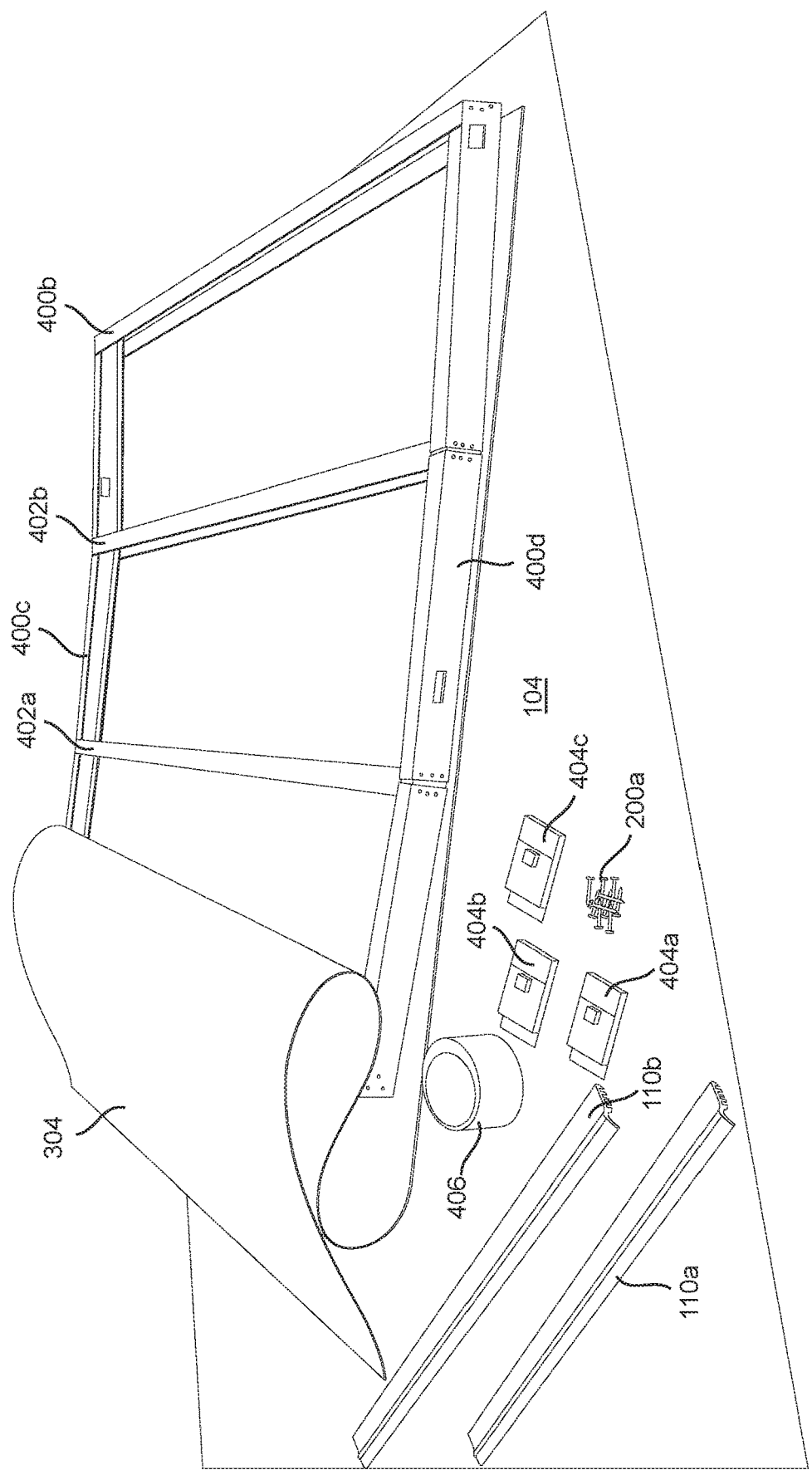
FIG. 6 illustrates a perspective view of the modular panel shown in FIG. 4, showing the frame assembled and the metallic sheet partially wrapped around the frame, in accordance with an embodiment of the present invention.

Turning now to FIG. 6, frame 500 also utilizes multiple reinforcement bars 402a, 402b that extend between two of the perimeter bars 400a, 400b in a parallel, spaced-apart relationship. Reinforcement bars 402a, 402b enhance structural integrity for frame 500. Reinforcement bars 402a-b also provide an additional mounting surface for attaching to sidewall 106 of above-ground pool 108. In one non-limiting embodiment, reinforcement bars 402a-b comprise 24 gauge galvanized steel rail. Though in other embodiments, other materials may be used to fabricate reinforcement bars 402a-b. In another embodiment, reinforcement bars 402a, 402b comprises at least two bars joined telescopically, or in short joints that make up a longer bar 402a.

In one non-limiting embodiment, a metallic sheet 304 wraps around the entirety of bars 400a-d, 402a-b to substantially encapsulate frame 500. This wrapping effect creates a mount side 300 to modular panel 102 that engages the sidewall 106 of above-ground pool 108, and a visible exterior side 302 that is visible, and in some embodiments, covered with a cover panel 104. In one non-limiting embodiment, metallic sheet 304 is fabricated from an aluminum sheet made from highly resilient material. In another embodiment, metallic sheet 304 may be an eco-foil. As metallic sheet 304 encapsulates frame 500, a cavity 900 forms between perimeter bars 400a-d. In this manner, frame 500 is substantially surrounded by metallic sheet 304, such that air is entrapped inside the cavity 900. The air serves as insulation for modular panels 102.

Those skilled in the art will recognize that gases/air possess poor thermal conduction properties compared to liquids and solids; and thus makes a good insulation material if they can be trapped. In order to further augment the effectiveness of a gas (such as air) it may be disrupted into small cells which cannot effectively transfer heat by natural convection. This is the case with trapping air inside the frame of the modular panels 102. In one embodiment, a cover panel 104 overlays the modular panels 102. The cover panel 104 may provide an aesthetic covering. And the cover panel 104 may have insulation characteristics to further increase the insulation of the assembly 100.

To help secure the metallic sheet 304 to the perimeter and reinforcement bars 402a, 402b, the assembly 100 provides an adhesive tape 406 (FIG. 5). Adhesive tape 406 works to fasten metallic sheet 304 to the perimeter bars 400a-d and/or reinforcement bars 402a, 402b of frame. Adhesive tape 406 is also used to cover and hold at least one magnet 404a-f in place on the frame 500, metallic sheet 304, or anywhere on modular panels 102 that would facilitate magnetic mounting to sidewall 106 of pool 108. In one embodiment, adhesive tape 406 is a silver, or shiny metallic tape, of a similar material composition as metallic sheet 304. In yet another non-limiting embodiment, adhesive tape 406 may be a strip of material at least ½" wide. Though other dimensions for adhesive tape 406 are possible.

In one non-limiting embodiment, adhesive tape 406 is also configured to fit flush-tight against the sidewall 106 of above-ground pool 108, and around the perimeter of frame 500, insuring the best air tight fit possible. This is critical to allow the modular panel 102 to perform at its maximum capabilities. Adhesive tape 406 is therefore effective in helping the frame to have direct contact with the sidewall 106 of the pool 108, while helping seal any small variations in the contact areas.

Figure 7:
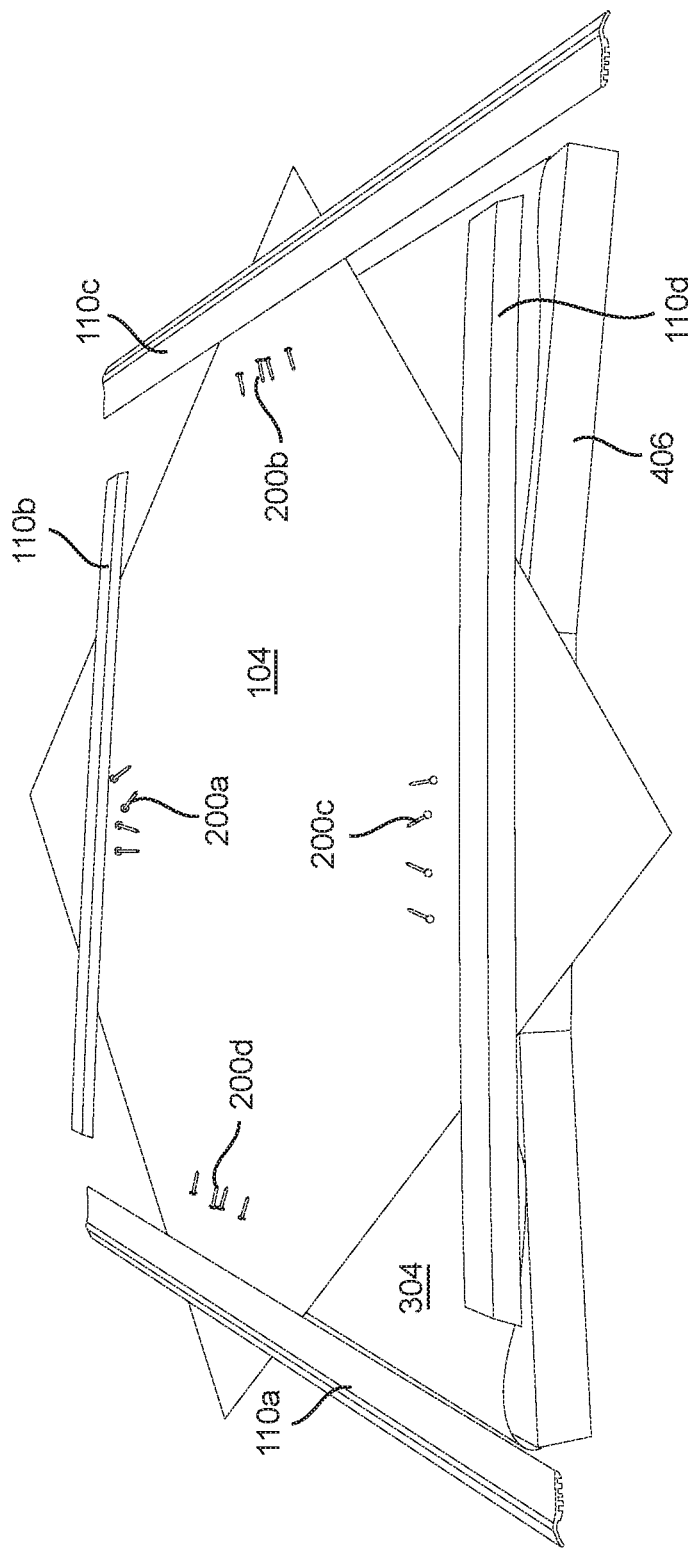
FIG. 7 illustrates a perspective view of the modular panel shown in FIG. 4, showing the frame assembled, the metallic sheet wrapped around the frame, and the adhesive tape fastening the metallic sheet to the frame, in accordance with an embodiment of the present invention.

Turning now to FIG. 7, modular panels 102 may further include multiple resilient strips 110a-d that join and overlay metallic sheet 304 and/or the cover panel 104, at or near the perimeter bars 400a-d. Resilient strips 110a-d help protect mount side 300 from the elements. Resilient strips 110a-d rest in alignment with, and parallel to, the perimeter bars 400a-d, at least partially covering the edges of frame 500.

Thus, resilient strip creates a boundary to frame. In one non-limiting embodiment, four resilient strips 110a, 110b, 110c, 110d overlay the rectangular perimeter of frame 500. In another non-limiting embodiment, resilient strips 110a-d comprise flat, rubber strips. Though in other embodiments, resilient strips 110a-d may be formed from polyurethane and other resilient polymers known in the art.

In one non-limiting embodiment, resilient strips 110a-d form at least one aperture in a spaced-apart relationship along length of resilient strip 110a-d. Further, at least one fastener 200a-d passes through aperture to fasten resilient strip to perimeter bars 400a-d and metallic sheet 304 (FIG. 8). In another non-limiting embodiment, resilient strip 110a-d attached to frame 500 using #8 1¼", Phillips tip, round, flat head, and self-tapping screws painted to match color of cover panel 104 or metallic sheet 304.

As shown in FIG. 9, once, resilient strips 110a, 110b, 110c, 110d are mounted to frame 500, the modular panel 102 is complete and ready to be mounted to sidewall 106 of above-ground pool 108. Each modular panel 102 is individually measured, then custom manufactured to fit above-ground pool 108. All exposed surfaces, i.e., of frame 500 are covered by metallic sheet 304 for both mount side 300 and exterior side 302. This allows for the most efficient heat retention (insulating) assembly 100 possible.

Figure 10:
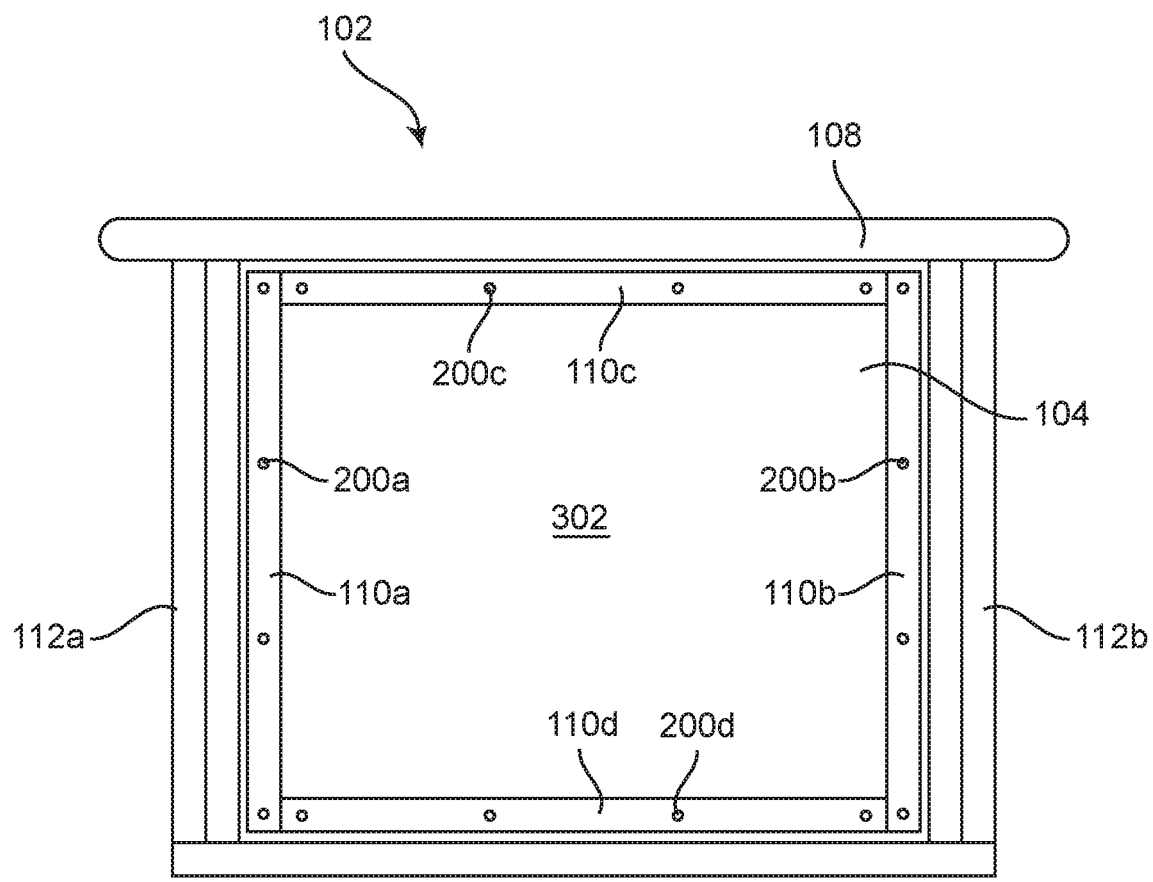
FIG. 10 illustrates a front view of the modular panel, showing the external side, in accordance with an embodiment of the present invention.
Figure 11:
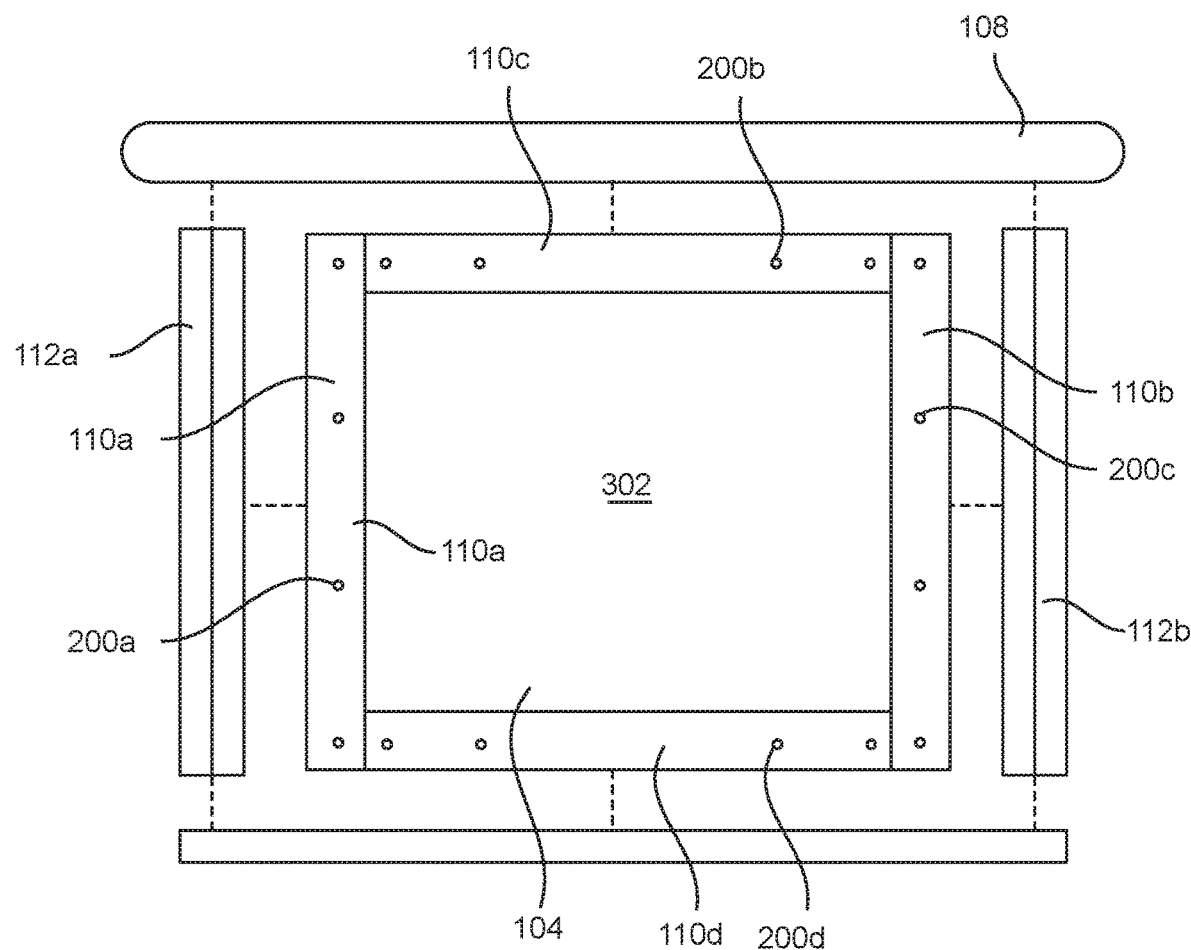
FIG. 11 illustrates a front view of the external side of the modular panel mounted to the sidewall of the above-ground pool, in accordance with an embodiment of the present invention.

As illustrated in FIG. 10, assembly 100 is operable to enable mounting to a sidewall 106 of an above-ground pool 108. In one mounting arrangement, perimeter bars 400a-d form a friction fit relationship with ribs 112a, 112b along the sidewall 106 of the above-ground pool 108. Modular panels 102 are fit into sidewall 106 between the ribs 112a, 112b in a snap fit relationship (FIG. 11). Though in other embodiments, screws, bolts, adhesives, magnets, and other fastening means may be employed to secure modular panel to ribs 112a-b, or any other mounting surface of pool 108, including upper rim, sidewall 106, pump, stairs, and interior sidewall of pool 108.

Figure 12:
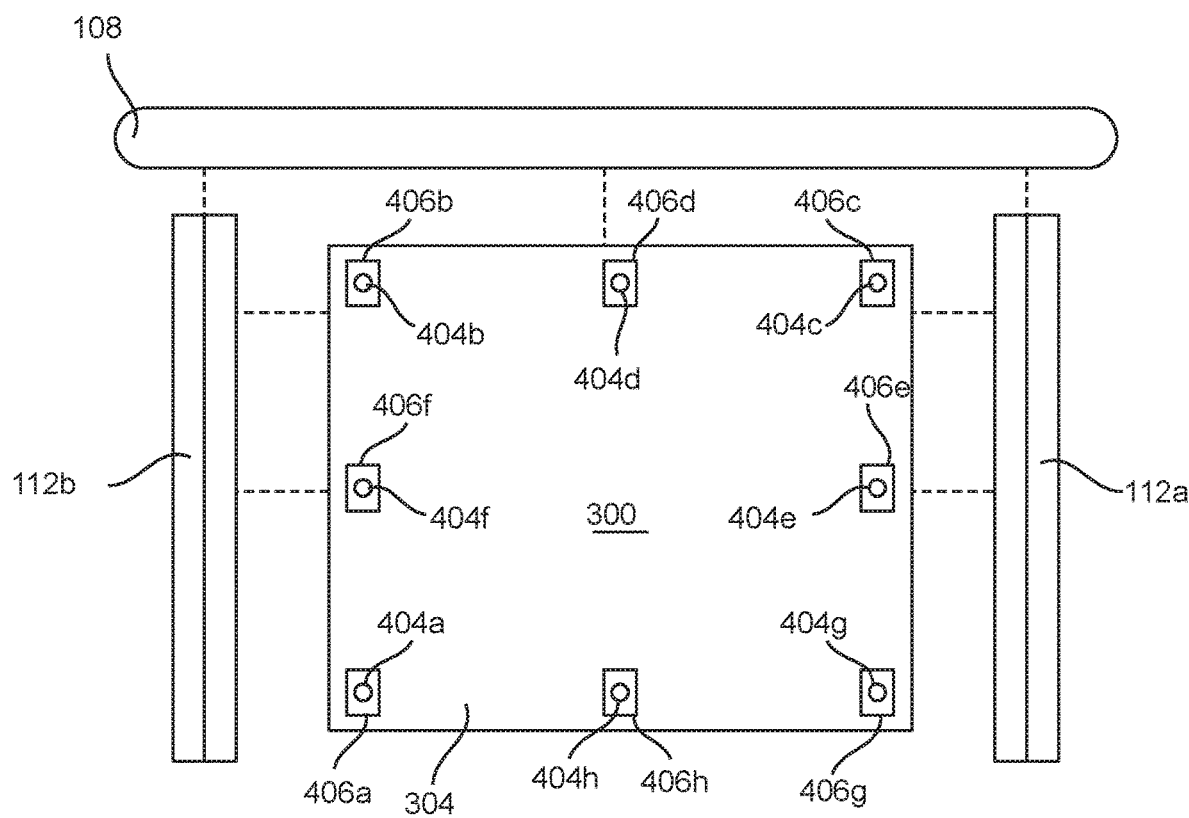
FIG. 12 illustrates a rear view of the mount side of the modular panel mounted to the sidewall of the above-ground pool, in accordance with an embodiment of the present invention.

In another mounting arrangement for modular panels 102 shown in FIG. 12, the perimeter bars 400a-d and the metallic sheet 304 are magnetically attached to sidewall 106 of above-ground pool 108 through use of at least one magnet 404a, 404b, 404c, 404d, 404e, 404f. Magnet 404a-f may be attached to frame 500, or the sidewall 106 of the above-ground pool 108. However, the magnet 404a-f may also be attached to or near the frame 500 and the sidewall 106 of the above-ground pool 108, so as to create a magnetic mounting means. In this magnetic mounting arrangement, modular panels 102 do not sit on the ground. Magnetic forces securely retain frame 500 to the sidewall 106, by placing at precise intervals, on the inside part of the frame 500 that makes contact with the exterior sidewall of the above-ground pool 108, rare earth magnets.

In one non-limiting embodiment, the magnet 404a-f is a rare earth magnet. The strength of the rare earth magnet is rated and calculated to achieve the maximum holding power needed with the least number of magnets. Those skilled in the art will recognize that this principle is the same as a refrigerator door held closed by a magnet. The combination of low weight, and magnetism, allow modular panels 102 to function as designed, with no tools, to be suspended firmly against the side of any cold rolled pool exterior surface. The bond is strong, but minimum effort is needed for install or removal.

In yet another mounting arrangement, each modular panel 102 is individually measured to fit snugly between stanchions against an above-ground pool 108 constructed from rolled steel, curved or flat. To allow a straight rail to fit snugly to a curved sidewall perimeter of a pool, the straight rail is cut into smaller lengths, then a tab is spot welded onto the ends between. This allows for a slight angle to be introduced in relation to the frame lengths on each side of the tab. The top, bottom, and sides, are welded together with two, evenly spaced, rail upright supports welded between at the top and bottom. Frame 500 is then covered with metallic sheet 304, or a product that performs equally.

Figure 13:
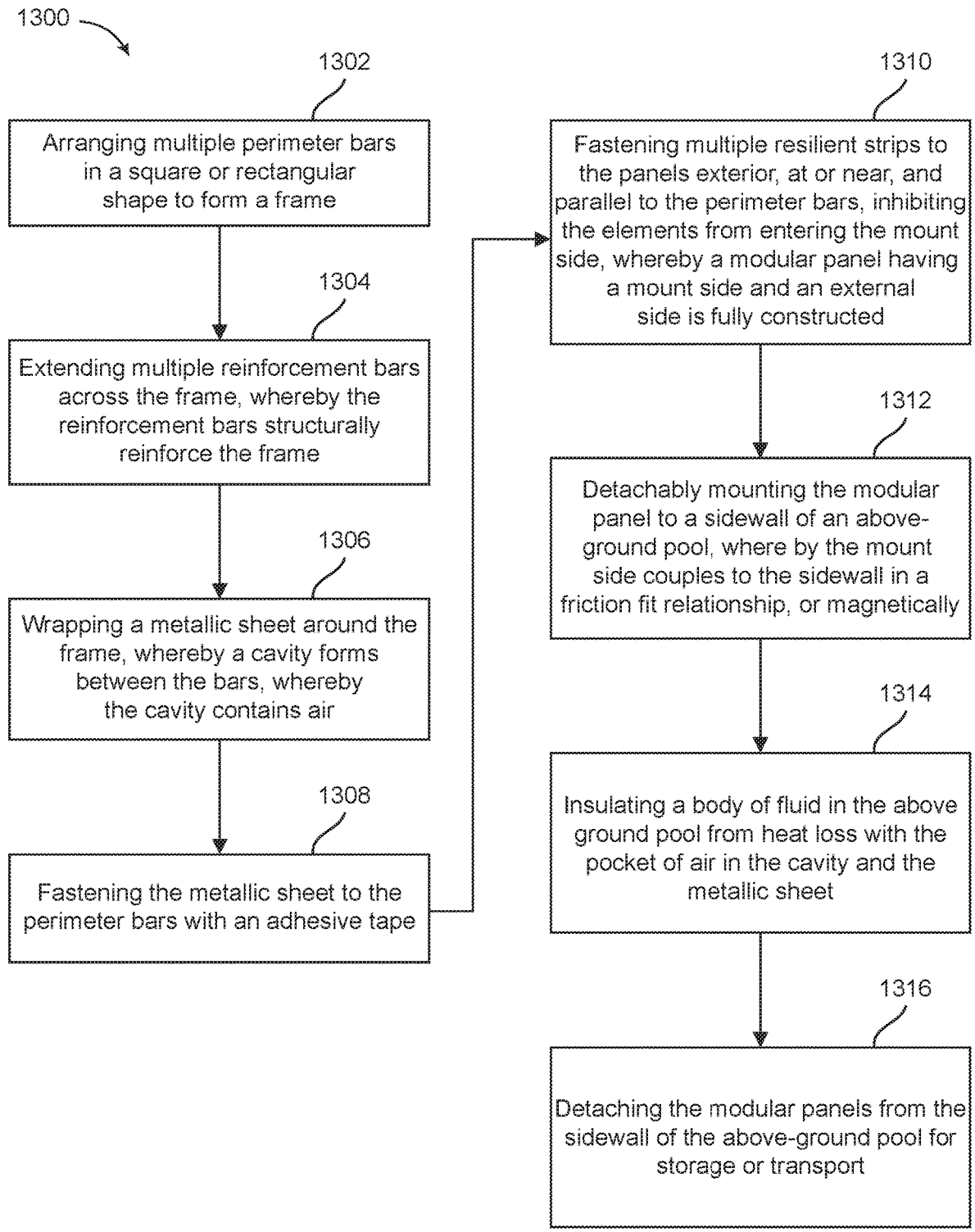
FIG. 13 illustrates a flowchart of an exemplary method 1300 of insulating an above-ground pool with an insulation assembly.

FIG. 13 illustrates a flowchart of an exemplary method 1300 of insulating an above-ground pool with an insulation assembly. Method 1300 may include an initial Step 1302 of arranging multiple perimeter bars in a square or rectangular shape to form a frame. Method 1300 may further comprise a Step 1304 of extending multiple reinforcement bars across the frame, whereby the reinforcement bars structurally reinforce the frame. A Step 1306 includes wrapping a metallic sheet around the frame, whereby a cavity forms between the bars, whereby the cavity contains air.

In some embodiments, a Step 1308 comprises fastening the metallic sheet to the perimeter bars with an adhesive tape. A Step 1310 includes fastening multiple rubber strips to the exterior at, or near, and parallel to the perimeter bars, whereby moisture is inhibited from entering the reverse or mount side, whereby a modular panel having a mount side and an external side is fully constructed. In some embodiments, a Step 1312 may include detachably mounting the modular panel to a sidewall of an above-ground pool, whereby the mount side couples to the sidewall in a friction fit relationship, or magnetically, or both. A Step 1314 comprises insulating a body of fluid in the above-ground pool from heat loss with the pocket of air in the cavity and the metallic sheet. Method 1300 may further comprise a final Step 1316 of detaching the modular panels from the sidewall of the above-ground pool for storage or transport.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An above-ground pool insulation assembly, the assembly comprising:
   a plurality of modular panels, the modular panels comprising a frame, the frame having:
      four perimeter bars arranged to form a perimeter; and
      multiple reinforcement bars extending between two of the perimeter bars in a parallel, spaced-apart relationship,
      whereby the perimeter bars form a square or rectangular shape;
   a metallic sheet encapsulating the frame, the metallic sheet forming a cavity between the perimeter bars, whereby the cavity contains air; a cover panel overlaying the modular panels; an adhesive tape fastening the metallic sheet to the perimeter bars, or the reinforcement bars, or both; and
   multiple resilient strips joined to the cover panel, at or near the perimeter bars,
   whereby the resilient strips help prevent moisture from entering the mount side.

2. The assembly of claim 1, wherein the modular panels are defined by a mount side and an exterior side.

3. The assembly of claim 1, wherein the perimeter formed by the perimeter bars is defined by a rectangular or square shape.

4. The assembly of claim 1, wherein the perimeter bars and the reinforcement bars comprise 24 gauge galvanized steel rail.

5. The assembly of claim 1, wherein the perimeter bars are welded together.

6. The assembly of claim 1, wherein the reinforcement bars comprises at least two reinforcement bars joined telescopically.

7. The assembly of claim 1, wherein the metallic sheet comprises aluminum.

8. The assembly of claim 1, wherein the adhesive tape comprises a metallic tape.

9. The assembly of claim 1, wherein the resilient strips comprise rubber strips.

10. The assembly of claim 1, wherein the resilient strips form at least one aperture.

11. The assembly of claim 10, further comprising at least one fastener, the fastener passing through the aperture formed in the resilient strips.

12. The assembly of claim 1, wherein the modular panels are operable to enable mounting to a sidewall of an above-ground pool.

13. The assembly of claim 12, wherein the fastener passing through the aperture formed in the resilient strips, fastens the cover panel to the metallic sheet.

14. The assembly of claim 13, wherein the perimeter bars form a friction fit relationship with ribs along the sidewall of the above-ground pool.

15. The assembly of claim 14, wherein the perimeter bars and the metallic sheet of the modular panel are magnetically attached to a metallic sidewall of the pool through at least one magnet.

16. The assembly of claim 1, further comprising a pool liner covering the sidewall.

17. An above-ground pool insulation assembly, the assembly consisting of:
   a plurality of modular panels operable to enable mounting to a sidewall of an above-ground pool, the modular panels defined by a mount side and an external side, the modular panels comprising a frame, the frame having:
      four perimeter bars arranged to form a perimeter having a square or rectangular shape; and
      multiple reinforcement bars extending between two of the perimeter bars in a parallel, spaced-apart relationship;
   a cover panel overlaying the external side of the modular panels;
   an aluminum metallic sheet encapsulating the frame, the aluminum metallic sheet forming a cavity between the perimeter bars,
   whereby the cavity contains air;
   a metallic adhesive tape fastening the metallic sheet to the perimeter bars, or the reinforcement bars, or both;
   multiple rubber strips joined to the cover panel, at or near, and parallel to the perimeter bars, the rubber strips forming at least one aperture,
   whereby the rubber strips help inhibit moisture from entering the mount side; with
   at least one fastener, the fastener passing through the aperture formed in the rubber strips; and
   at least one magnet joined to the frame, or the sidewall of the above-ground pool, or both.

18. The assembly of claim 17, wherein the perimeter bars and the metallic sheet of the modular panel are magnetically attached to a metallic sidewall of the pool through at least one magnet.

19. The assembly of claim 17, further comprising a pool liner covering the sidewall.

20. A method of insulating an above-ground pool, the method comprising:
   arranging multiple perimeter bars in a square or rectangular shape to form a frame;
   extending multiple reinforcement bars across the frame, whereby the reinforcement bars structurally reinforce the frame;

wrapping a metallic sheet around the frame, whereby a cavity forms between the bars, whereby the cavity contains air;

fastening the metallic sheet to the perimeter bars with an adhesive tape;

fastening multiple rubber strips to the cover panel, at or near, and parallel to the perimeter bars, whereby moisture is inhibited from entering the mount side, whereby a modular panel having a mount side and an external side is fully constructed;

detachably mounting the modular panel to a sidewall of an above-ground pool, whereby the mount side couples to the sidewall in a friction fit relationship, or magnetically, or both;

insulating a body of fluid in the above-ground pool from heat loss with the pocket of air in the cavity and the metallic sheet; and detaching the modular panels from the sidewall of the above-ground pool for storage or transport.

* * * * *